United States Patent [19]

Harvey

[11] Patent Number: 4,772,057
[45] Date of Patent: Sep. 20, 1988

[54] BALANCED SHOVEL

[76] Inventor: Henry R. Harvey, Box 207, Lahaska, Pa. 18931

[21] Appl. No.: 79,032

[22] Filed: Jul. 28, 1987

[51] Int. Cl.⁴ .................................................. A01B 1/02
[52] U.S. Cl. ...................................... 294/58; 224/205; 224/250; 224/264; 294/49; 294/59
[58] Field of Search ................. 294/49, 51, 54.5, 55.5, 294/57-60; D8/1, 10; 37/265, 284, 285; 16/110 R, 114 R; 224/150, 202, 205, 250-252, 257, 258, 264; 254/131.5, 132

[56] References Cited

U.S. PATENT DOCUMENTS

| D. 29,737 | 11/1898 | Gunning . | |
|---|---|---|---|
| 62,594 | 3/1867 | Beale . | |
| D. 190,870 | 7/1961 | Bankenship . | |
| 237,891 | 2/1881 | Musselman . | |
| D. 269,936 | 8/1983 | Storlie . | |
| D. 270,562 | 9/1983 | Skeen . | |
| D. 270,612 | 9/1983 | Storlie . | |
| D. 275,928 | 10/1984 | LoPresti . | |
| 519,515 | 5/1894 | Walsh | 294/58 |
| 635,591 | 10/1899 | Rasmussen | 294/59 X |
| 781,772 | 2/1905 | Gifford . | |
| 845,592 | 2/1907 | Stewart | 294/57 |
| 1,693,472 | 11/1928 | Batty . | |
| 2,092,279 | 9/1937 | Jeffers . | |
| 2,430,802 | 11/1947 | Catlin . | |
| 2,521,441 | 9/1950 | Bickley . | |
| 2,565,466 | 8/1951 | Barker | 294/57 |
| 2,716,538 | 8/1955 | Arrowood . | |
| 3,078,604 | 2/1963 | Neuman | 294/59 X |
| 3,136,574 | 6/1964 | Pasquale | 294/58 X |
| 3,317,098 | 5/1967 | Auraen | 224/250 X |
| 3,436,111 | 4/1969 | England . | |
| 3,466,078 | 9/1969 | Sholund | 294/58 X |
| 3,964,182 | 6/1976 | Pomeret . | |
| 4,103,954 | 8/1978 | Vaslas . | |
| 4,198,090 | 4/1980 | Gutman . | |
| 4,477,972 | 10/1984 | Testa | 254/131.5 X |

FOREIGN PATENT DOCUMENTS

| 52045 | 8/1936 | Denmark | 294/58 |
|---|---|---|---|
| 610079 | 3/1935 | Fed. Rep. of Germany | 294/60 |
| 1306074 | 9/1962 | France | 294/58 |
| 95439 | 2/1960 | Norway | 294/59 |
| 6307 | of 1886 | United Kingdom | 294/59 |
| 109705 | 9/1917 | United Kingdom | 294/59 |

Primary Examiner—Johnny D. Cherry
Attorney, Agent, or Firm—William H. Eilberg

[57] ABSTRACT

This invention is a shovel which enables the user to lift loads with ease, and without suffering back strain. The shovel includes an elongated, curved body, having a first handle protruding from the middle of the body, and a shovel blade at one end. A second handle is located at the other end of the body. A strap is attached to the shovel body, so as to fit over the user's shoulder. One end of the strap is connected to the body near the second handle, and the other end of the strap is fastened to the body at a point between the first handle and the blade. The user grasps both handles, using the first handle to define a pivoting axis for the shovel. The lifting is accomplished by pushing down on the second handle, making the shovel pivot about the first handle. Due to the action of the strap, the user's shoulder supports much of the weight of the load. The first handle is preferably rotatable, relative to the shovel body, so as to facilitate the pivoting motion. The shovel reduces the necessity for bending over while shoveling; most lifting can be done from a standing position. For this reason, the shovel does not cause strain to the back. The shovel may also include a counterweight, mounted near the second handle, which effectively cancels the perceived weight of the shovel blade, allowing the user to lift the load without feeling the weight of the shovel blade.

17 Claims, 2 Drawing Sheets

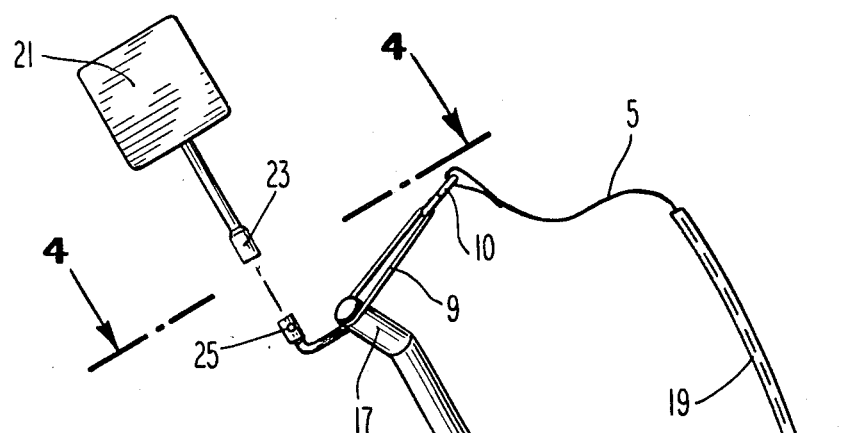
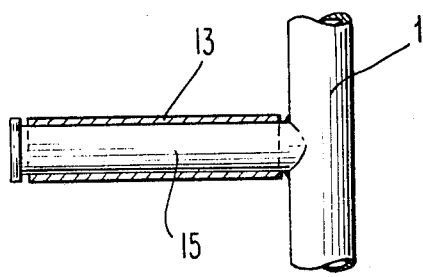
Fig. 2
Fig. 3
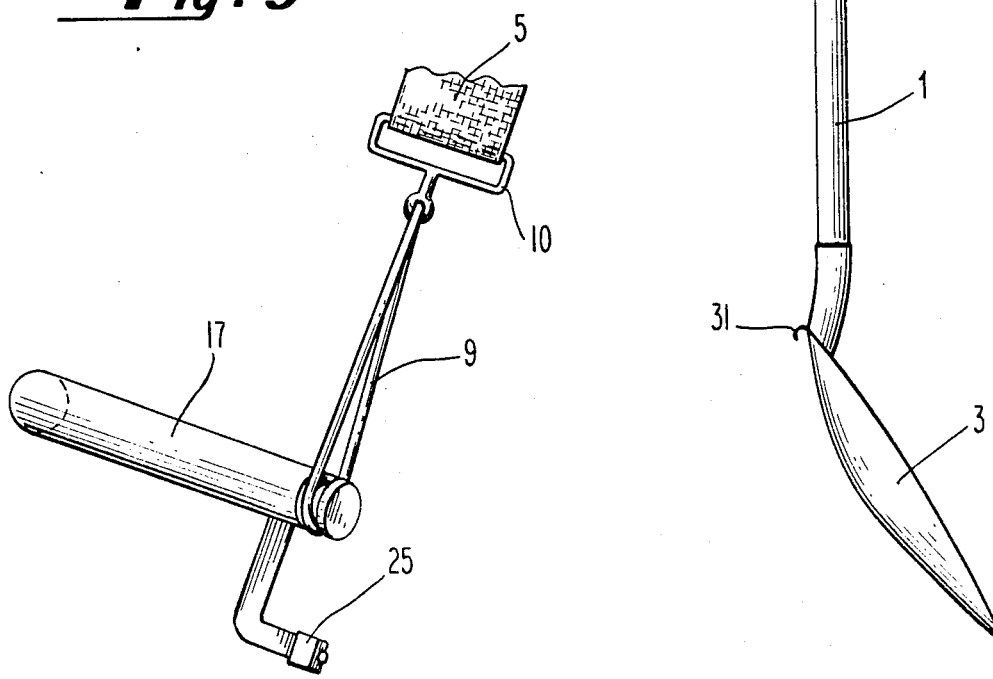
Fig. 4

BALANCED SHOVEL

BACKGROUND OF THE INVENTION

The present invention is a general-purpose shovel which can be used for lifting loads with great ease and efficiency, without causing back strain.

Shoveling loads, such as earth or snow, is laborious and tedious. Shoveling also strains the back, and can aggravate a pre-existing back condition. With most shovels of the prior art, the user must bend over, while grasping the shovel body near the blade, in order to lift the load. The repeated bending and lifting places great forces on the vertebrae. Moreover, if the user attempts to do less bending, such as by gripping the shovel body at a point farther from the shovel blade, then the moment arm of the load is increased, and the corresponding strain on the back is even greater.

There have been various attempts, in the prior art, to provide shovels having auxiliary handles which could eliminate the discomfort and inconvenience of bending over. For example, U.S. Pat. No. 2,521,441 shows a snow shovel having an auxiliary handle, the auxiliary handle being attached to a cord affixed to the shovel blade. The shovel blade can be lifted, in most cases, while the user remains in a standing position.

U.S. Pat. Nos. 781,772 and 1,693,472 both show snow shovels having auxiliary handles near the midpoint of the shovel bodies. In both of these patents, the auxiliary handle generally resembles a standard shovel handle, and is securely affixed to the shovel body.

U.S. Pat. No. 2,430,802 shows still another auxiliary hand grip for shovels. Other patents showing a lifting structure for a shovel include U.S. Pat. No. Des. 269,936 and Des. 270,612.

U.S. Pat. No. 3,964,182 discloses a mechanical shovel which also does not require the user to bend over. The shovel includes a harness which fits around the user. However, this shovel is a powered tool; in the embodiment shown, the apparatus is powered pneumatically.

The present invention is a shovel which is much more easily operated than any of the shovels in the known prior art. It is not a powered tool, but is operated by hand. By distributing the weight of the shovel and the load in a novel way, the present invention enables the user to manipulate heavy loads, for relatively long periods of time, without suffering pain in the back. The shovel of the present invention may also be used by persons who already suffer from a bad back condition, as the shovel is not likely to aggravate such a condition.

SUMMARY OF THE INVENTION

The shovel of the present invention includes an elongated shovel body, one end of which is attachable to a shovel blade. A first handle is mounted near the middle of the body, and protrudes from the body at an angle of about 90°. A second handle is disposed at the end of the body opposite the blade. This second handle can be integrally formed with the body.

A strap is attached to the body near the second handle, and also at a point between the first handle and the blade. The strap and the shovel body together form a closed loop. The strap is sufficiently long to extend over the user's shoulder.

The user places the strap over the shoulder, and grips the first and second handles. In the preferred embodiment, the first handle includes a tubular member which rotates relative to the body, so that the handle may be easily pivoted. The user then lifts the load by pushing down on the second handle, and causing the shovel body to pivot around the first handle. Much of the weight of the load is transferred to the shoulder, due to the action of the strap. To minimize irritation to the shoulder due to friction from the rubbing of the strap, the strap may be threaded through a sheath which rests on the shoulder.

The shovel body is preferably bent at a point near the first handle. The direction of the angle of the bend is such that the position of the second handle is lowered due to the bend. A lower position for the second handle makes it easier to control the shovel, because the user's hand does not need to be placed in an awkward position.

A counterweight is detachably mounted at the end of the shovel body near the second handle. The counterweight, which may be a flat piece of heavy metal, effectively cancels the perceived weight of the shovel blade, at the expense of placing some added weight on the shoulder. The counterweight enables the user to concentrate on lifting the weight of the load, without also feeling the weight of the blade.

It is therefore an object of the invention to provide a shovel which can be used to lift loads with minimal effort.

It is another object to reduce back strain associated with shoveling of various loads.

It is another object to provide a shovel in which the weights of the load, the shovel body, and the blade, are efficiently distributed.

It is another object to provide a shovel wherein the perceived weight of the shovel is effectively cancelled by a counterweight, and wherein substantially the only weight which is felt, by the user, is the weight of the load.

It is another object to provide a shovel which can be operated from a standing position.

It is another object to provide a shovel which can be used with comfort, and which does not require the user to assume an awkward position.

Other objects and advantages of the invention will be apparent to those skilled in the art, from a reading of the following brief description of the drawings, the detailed description of the invention, and the appended claims.

BRIEF DESCRIPTION OF THE DRAWINGS

FIG. 2 is a side elevational view of the shovel.

FIG. 3 is a cross-sectional view, taken along the line 3—3 of FIG. 2, showing the structure of the first handle of the shovel.

FIG. 4 is an end view, taken along the line 4—4 of FIG. 2, showing details of the connection of the strap to the shovel body, and the means of attachment of the counterweight.

DETAILED DESCRIPTION OF THE INVENTION

Figure 1:
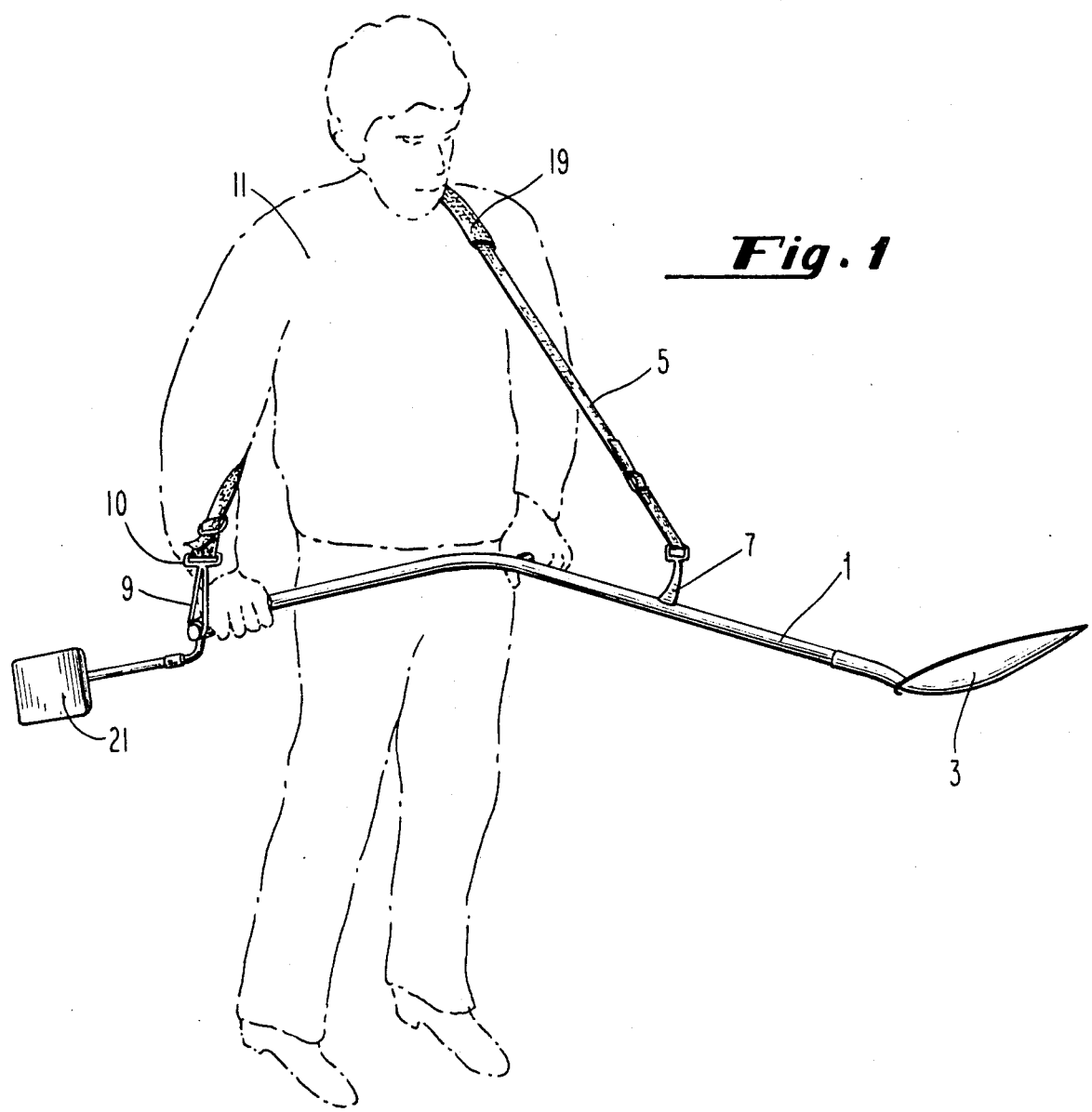
FIG. 1 is a perspective view of the shovel of the present invention, showing the shovel being operated by a user.

The shovel of the present invention is shown, in a perspective view, in FIG. 1. The shovel includes body 1 and blade 3. Strap 5 is attached to body 1 by anchor 7 at one end, and by loop 9 and swivel bracket 10 at the other end. The strap is fitted over the shoulder of user 11, as shown. The strap can be made adjustable, so that the same shovel can be used by many different persons.

The structure of the shovel is more clearly illustrated in the views of FIGS. 2, 3, and 4. As shown in FIGS. 2 and 3, tubular handle 13 is rotatably mounted on protrusion 15, which extends from body 1 at an angle of about 90°. Tubular handle 13 is called the "first" handle, in this description. A second handle, indicated by reference numeral 17, is attached to body 1, at the end opposite that of shovel blade 3. The second handle may be integrally formed with the body, or it may be separately fashioned and later joined to the body. It is preferred that the second handle extend from the body at an angle, as shown in FIG. 2, such that the axes of the first and second handles do not lie in the same plane.

As shown in FIG. 1, user 11 grips both handles, using the first handle as a pivot point. Because the tubular handle is rotatably mounted on protrusion 15, the tubular handle remains stationary relative to the user's hand when the shovel is pivoted. However, it is also possible to construct the handle so that it does not rotate.

The user can lift a load by moving the second handle downward (with the right hand, in the arrangement shown in FIG. 1), causing the shovel to pivot around the first handle. Most of the weight of the shovel and load is transmitted to the user's shoulder, through strap 5.

Strap 5 is threaded through sheath 19, which rests upon the user's shoulder, and does not move as the strap travels back and forth. The sheath prevents the strap from rubbing directly along the shoulder, and thus reduces possible irritation to the shoulder. The sheath therefore increases the length of time that the shovel can be used continuously.

It is preferred that the inner portion of the sheath be made of a low-friction material, such as nylon, and that the outer portion be made of a rubbery, high-friction surface. The rubbery surface tends to hold the sheath in place on the user's shoulder, while the inner surface minimizes the friction due to sliding of the strap. It is also possible to use padding, between the sheath and the shoulder. Other equivalent materials can be used in making the sheath.

The strap may also be provided with a "stop" to prevent it from sliding more than a predetermined distance, within the sheath.

The shovel may also include counterweight 21, which is shown as a square or rectangular piece of metal. The counterweight can have virtually any other shape. If the counterweight is reasonably heavy, it will balance the weight of the shovel blade, so that the user does not feel the weight of the blade. The counterweight is attached to locking member 23 which mates with complementarily shaped locking member 25, attached to second handle 17. The counterweight can thus be easily attached and removed, as desired. It is understood, however, that the counterweight is optional, and that the invention can be practiced without it.

Figure 5:
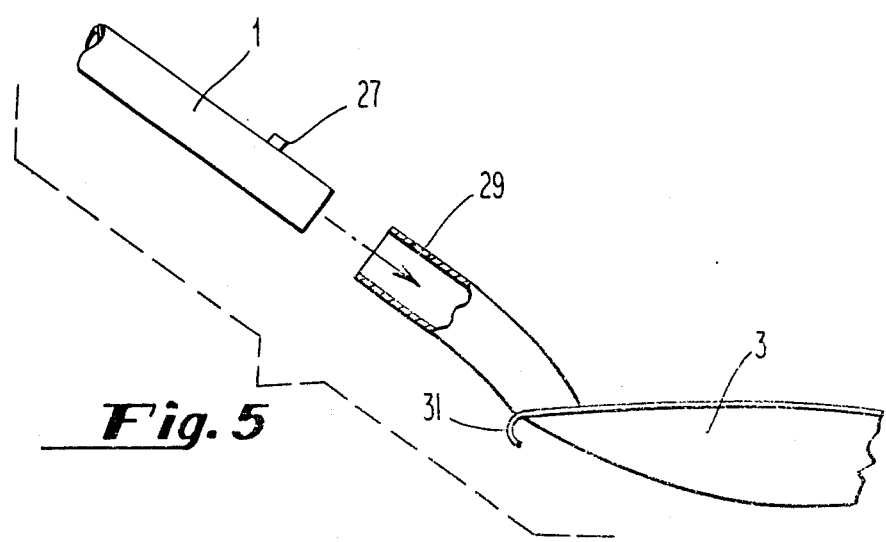
FIG. 5 is a fragmentary view, partially in cross-section, showing the attachment of an alternative shovel blade to the shovel body.

FIG. 5 shows the attachment of a shovel blade to the shovel body. Blade 3 is affixed to body 1 by forcing protrusion 27 into hole 29. Thus, the same shovel body can be fitted with a plurality of different types of shovel blades. In particular, the shovel can be fitted with a blade suitable for lifting and moving soil in summer, and can be fitted with a blade for shoveling snow in winter.

The blade for lifting soil may include a set of teeth or fingers which pierce the soil more efficiently than a flat blade. A blade for shoveling snow, however, does not require such fingers, and can have a flat end only.

The shovel blade can also include strip 31, attached to the rear of the blade, to facilitate the removal of soil from the ground. The strip acts as a lever which helps to pry the soil out of the ground when the second handle of the shovel is moved downward.

The body of the shovel is bent, as shown in both FIGS. 1 and 2. The bend is preferably located near the first handle, and opposite the blade. The angle of the bend is such that the straight portions of the body form an obtuse angle; the direction of the angle makes the position of the second handle lower than it would be if the bend were not present. Thus, as shown in FIG. 1, the right hand of the user is lower than it would be if the bend in the shovel body were not present. The bend therefore ensures that the shovel can be gripped and controlled from a comfortable position.

In operation, the user places the strap over the shoulder, and grasps the first and second handles. In the embodiment shown in FIG. 1, the left hand grasps the first handle, and the right handle grasps the second handle. The shovel could be modified to accommodate left-handed persons; in the latter case, the first handle would protrude from the opposite side of the shovel body, and the shovel body would be positioned to the left of the user.

The user lowers the shovel blade to the level of the ground by lifting the second handle, while holding the first handle in its original position. When the blade has engaged the load, the user pushes down on the second handle, while maintaining the first handle in its original position. As the second handle is pushed down, the strap moves along the user's shoulder, and the shovel body pivots around the first handle. Much of the weight of the load is thereby transferred to the shoulder; some of the weight is carried by the arms. As the second handle is moved up and down, the strap slides alternately in both directions, along the shoulder. Swivel bracket 10 allows the strap to hold the shovel body without interfering with the motions of the user's arms. Most of the shoveling operation is done in a standing position.

The present invention can be used for comparatively long periods, with very little fatigue. What fatigue does occur does not affect the back. The invention has been found not to aggravate a pre-existing back condition.

The invention has been described with respect to one embodiment, but it is understood that many variations are possible. The precise angles of the first and second handles may be changed. The cross-sections of the shovel body and/or the handles may also be varied. Different means of attachment of the shovel blade, the counterweight, and the strap may be employed. These and other similar modifications are to be considered within the spirit and scope of the following claims.

What is claimed is:

1. A shovel, comprising:
   (a) an elongated shovel body, the body having at least two generally straight portions, the straight portions making an obtuse angle with each other,
   (b) a blade attached to one end of the body,
   (c) a first handle, attached to the body and protruding therefrom, (d) a second handle, located at the end of the body opposite the blade, the second handle being attached to the body, and (e) a strap, the strap having two ends, one end being attached to the body at a point near the second handle, the other end being attached to the body at a point between the first handle and the blade, the points of attachment of the ends of the strap to the body being spaced apart such that a portion of the weight of the body can be supported, by the strap, at both points.

2. A shovel, comprising:

(a) an elongated shovel body, the body being attachable at one end to a shovel blade, (b) a first handle means, attached to the shovel body and located near the center of the shovel body, (c) a second handle means, located at the end of the body opposite the end which is attainable to a shovel blade, and (d) strap means, the ends of the strap means being connected to the shovel body at two points, the strap means being of sufficient length to allow the strap means to extend over the shoulder of a user of the shovel, the points of attachment of the ends of the straps means to the body being spaced apart such that a portion of the weight of the body can be supported, by the strap means, at both points.

3. The shovel of claim 2, wherein the first handle means comprising a tubular member which is rotatably mounted to a protrusion affixed to the shovel body.

4. The shovel of claim 2, wherein the second handle means is integrally formed with the shovel body.

5. The shovel of claim 2, wherein one of the points of connection of the strap means is near the second handle means, and wherein the other point of connection is between the first handle means and the end of the body which is attachable to a blade.

6. The shovel of claim 2, wherein the shovel body is bent near the first handle means, the direction of the angle of bend being such as to lower the position of the second handle means, when the shovel is in use.

7. A shovel, comprising:

(a) an elongated shovel body, the body having at least two generally straight portions, the straight portions making an obtuse angle with each other, (b) a blade attached to one end of the body, (c) a first handle, attached to the body and protruding therefrom, (d) a second handle, located at the end of the body opposite the blade, the second handle being attached to the body, (e) a strap, the strap having two ends, one end being attached to the body near the second handle, the other end being attached to the body at a point between the first handle and the blade, and (f) a counterweight, the counterweight being removably mounted to the body, at the end near the second handle.

8. The shovel of claim 7, wherein the first handle includes a tubular member mounted for rotation around a protrusion which extends from the shovel body.

9. The shovel of claim 8, further comprising a sheath, the strap being threaded through the sheath, the sheath being of sufficient length to fit over the shoulder of a user of the shovel.

10. The shovel of claim 9, wherein the second handle and the first handle are generally cylindrical, and wherein said handles have axes which do not lie in the same plane.

11. A shovel, comprising a shovel body, the body having a shovel blade attached at one end of the body, a first handle means protruding from one side of the shovel body, a second handle means disposed near the end of the shovel body opposite the blade, strap means having two ends, one end of the strap means being attached to the body near the second handle means, the other end of the strap means being attached to the body between the first handle means and the blade, and counterweight means, the counterweight means being removably mounted to the shovel body, near the second handle means.

12. The shovel of claim 11, wherein the body comprises at least two generally straight, elongated portions, said portions being joined together and forming an obtuse angle with each other.

13. A shovel, comprising:

(a) an elongated shovel body, the body being attachable at one end to a shovel blade, (b) a first handle means, attached to the shovel body and located near the center of the shovel body, (c) a second handle means, located at the end of the body opposite the end which is attachable to a shovel blade, (d) strap means, the ends of the strap means being connected to the shovel body at two points, the strap means being of sufficient length to allow the strap means to extend over the shoulder of a user of the shovel, and (e) counterweight means, detachably mounted to the end of the shovel body near the second handle means.

14. A shovel, comprising:

(a) an elongated body, the body having two ends, the body being attachable to a shovel blade at the first of its ends, (b) a handle means protruding from the body, the handle means including a tubular member rotatably mounted on the handle means, (c) strap means, connected to the body at two points, one of the points of connection being near the second end of the body, and the other point being between the handle means and the blade, and (d) a counterweight, detachably mounted to the end of the body near the second end of the body.

15. A shovel, comprising a shovel body, the body having a shovel blade attached at one end of the body, a first handle means protruding from one side of the shovel body, a second handle means disposed near the end of the shovel body opposite the blade, and strap means, the strap means having two ends, one end of the strap means being attached to the body at a point near the second handle means, the other end of the strap means being attached to the body at a point between the first handle means and the blade, the points of attachment being spaced apart such that a portion of the weight of the body can be supported, by the strap means, at both points.

16. The shovel of claim 15, further comprising sheath means, the strap means being threaded through the sheath means, the sheath means being of sufficient length to fit over the shoulder of a user of the shovel.

17. A shovel, comprising a shovel body, the body having a shovel blade attached at one end of the body, a first handle means protruding from one side of the shovel body, a second handle means disposed near the end of the shovel body opposite the blade, a strap means having two ends, one end of the strap means being attached to the body near the second handle means, the other end of the strap means being attached to the body between the first handle means and the blade, and a sheath, the strap means being threaded through the sheath, the sheath being of sufficient length to fit over the shoulder of a user of the shovel.

* * * * *